United States Patent [19]

Kozuki et al.

[11] Patent Number: 4,791,487
[45] Date of Patent: Dec. 13, 1988

[54] PICTURE SIGNAL CONVERSION DEVICE

[75] Inventors: Susumu Kozuki, Tokyo; Tadayoshi Nakayama; Chikara Sato, both of Kanagawa, all of Japan

[73] Assignee: Canon Kabushiki Kaisha, Tokyo, Japan

[21] Appl. No.: 877,899

[22] Filed: Jun. 24, 1986

[30] Foreign Application Priority Data

Jun. 28, 1985 [JP] Japan .................. 60-143321
Jun. 28, 1985 [JP] Japan .................. 60-143322
Jun. 28, 1985 [JP] Japan .................. 60-143323
Jun. 28, 1985 [JP] Japan .................. 60-143324

[51] Int. Cl.$^4$ .................. H04N 7/12; H04N 7/01; H04N 5/14
[52] U.S. Cl. .................. 358/140; 358/136; 358/166
[58] Field of Search .................. 358/140, 160, 166, 11, 358/136, 105

[56] References Cited

U.S. PATENT DOCUMENTS

| 4,218,703 | 8/1980 | Netravali et al. | 358/136 |
| 4,232,338 | 11/1980 | Netravali et al. | 358/105 |
| 4,383,272 | 5/1983 | Netravali et al. | 358/136 |
| 4,530,004 | 7/1985 | Achiha et al. | 358/11 |
| 4,673,978 | 6/1987 | Dischert et al. | 358/140 |
| 4,677,483 | 6/1987 | Dischert et al. | 358/11 |

Primary Examiner—James J. Groody
Assistant Examiner—John K. Peng
Attorney, Agent, or Firm—Robin, Blecker & Daley

[57] ABSTRACT

A picture signal conversion device arranged to obtain an interpolation signal by using a scanning line signal of a first picture signal which has scanning line signals corresponding to a predetermined number of scanning lines within one field period and to convert the first picture signal into a second picture signal which has a greater number of scanning lines than that of the first picture signal comprises: first interpolation signal generating means which generates a first interpolation signal for the present field by using a scanning line signal obtained within the present field; second interpolation signal generating means which generates a second interpolation signal for the present field by using a scanning line signal of another field; output means arranged to detect the correlativity of scanning line signal between fields and to selectively produce, according to the detected correlativity, the first or second interpolation signal generated from the first or second interpolation signal generating means; and detection characteristic control means for controlling the correlativity detecting characteristic of the output means according to the inclination of the correlativity among scanning lines obtained within a predetermined period.

31 Claims, 7 Drawing Sheets

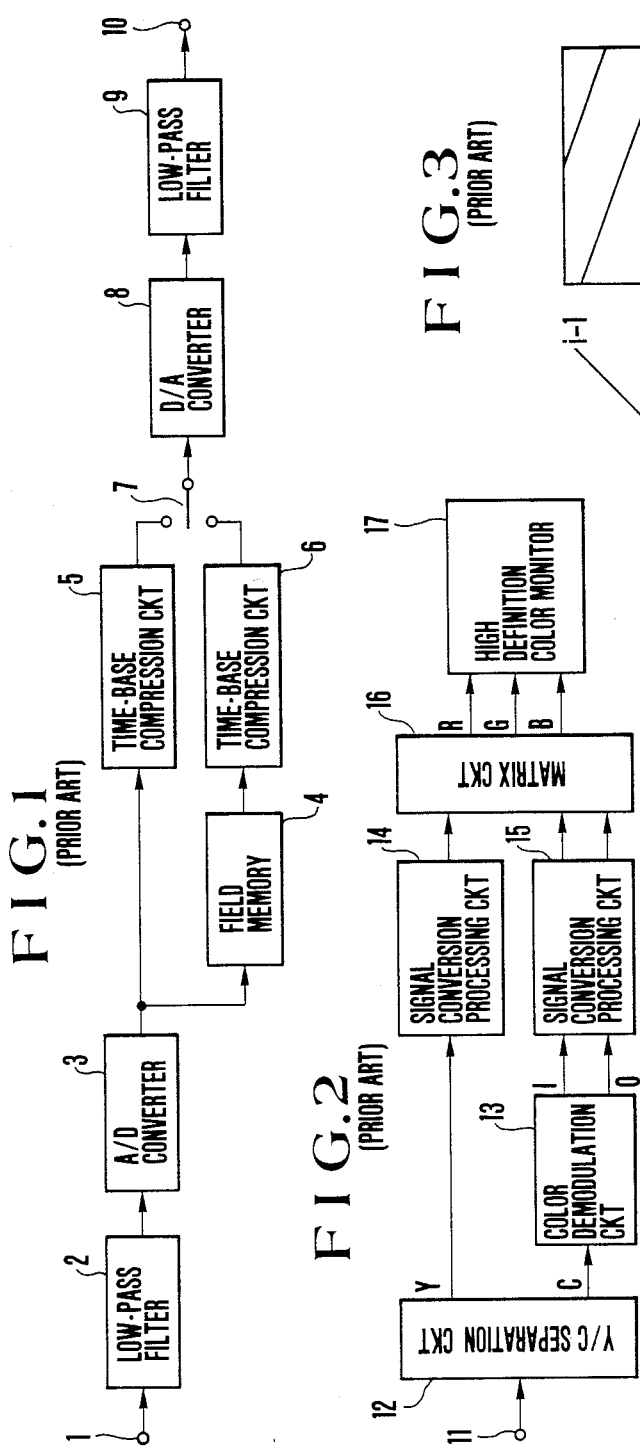
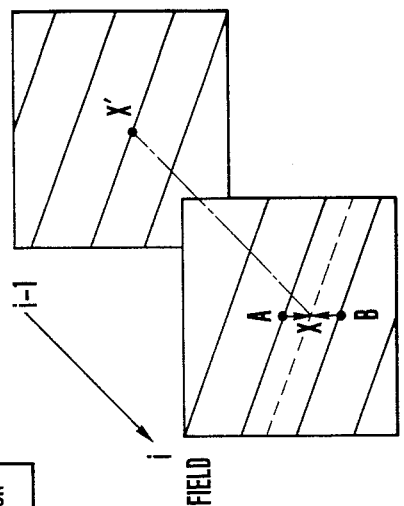

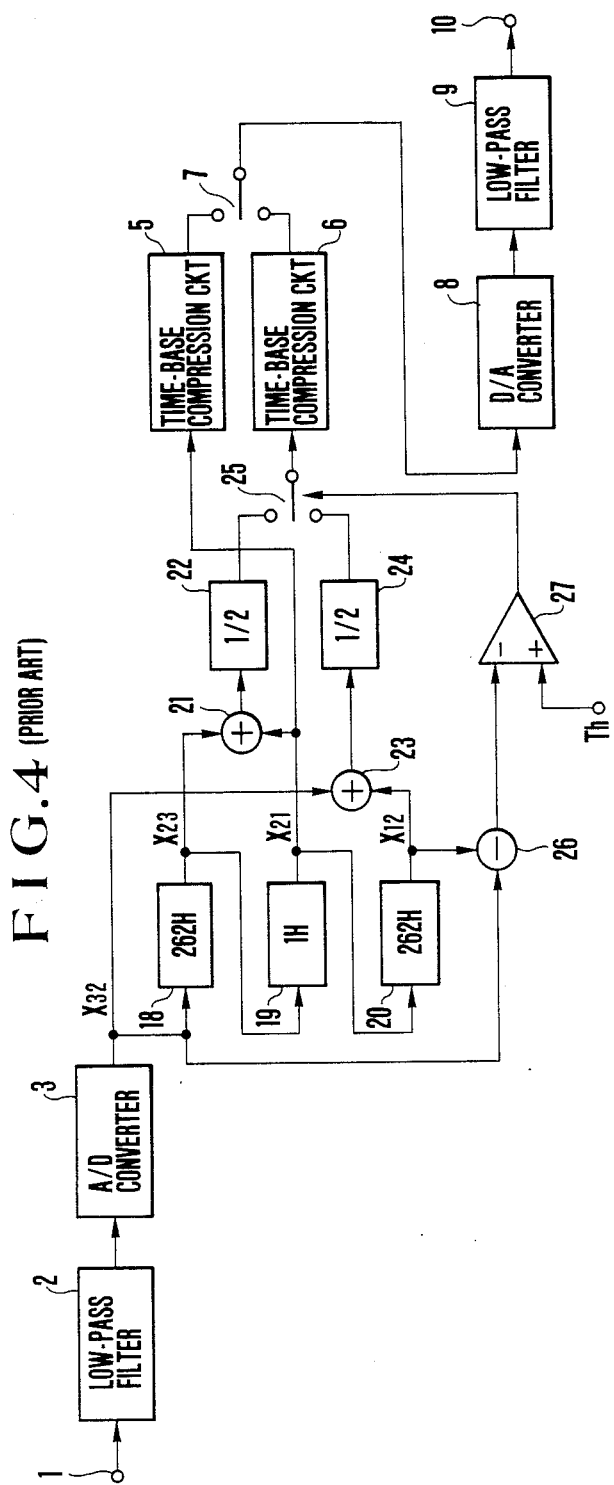

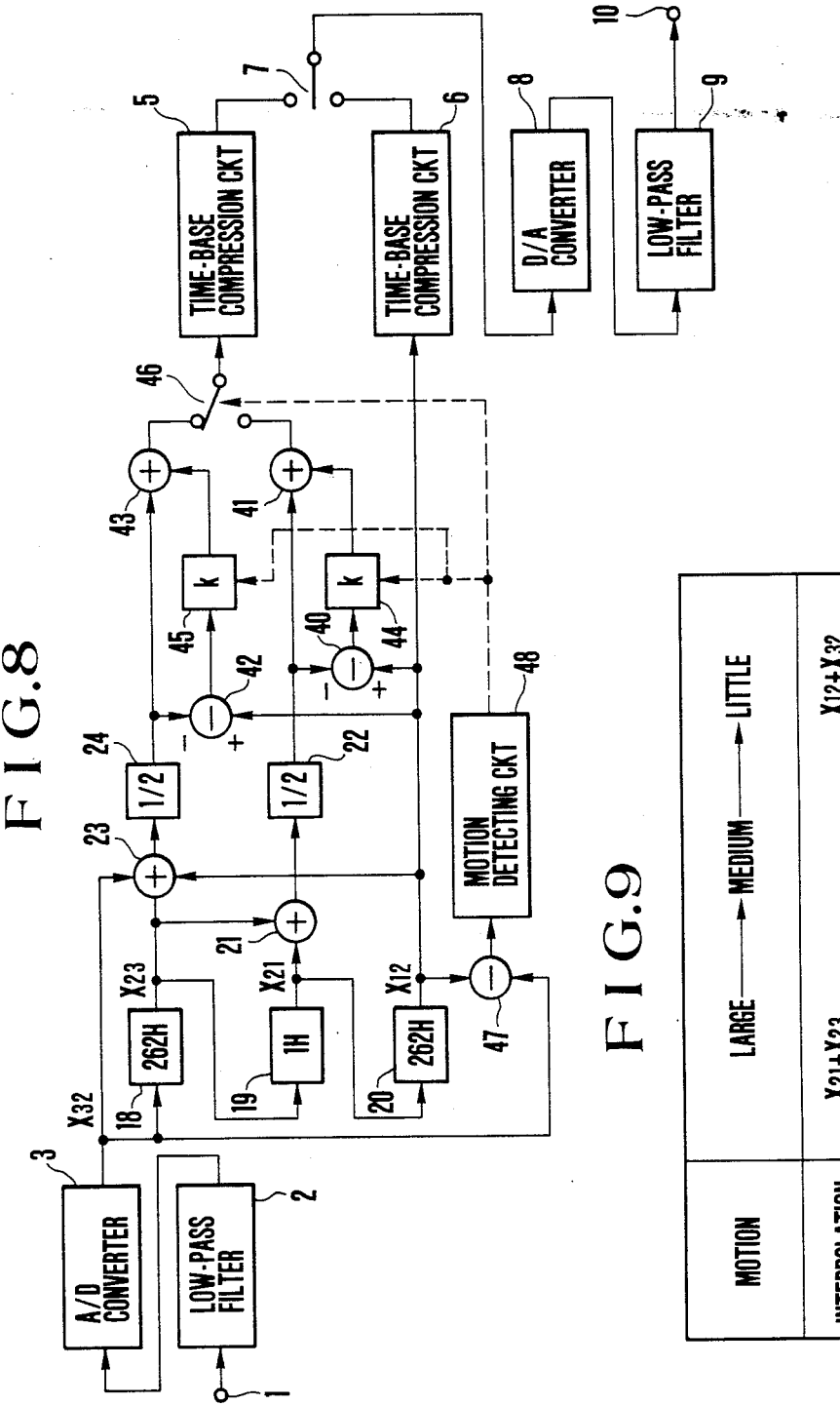

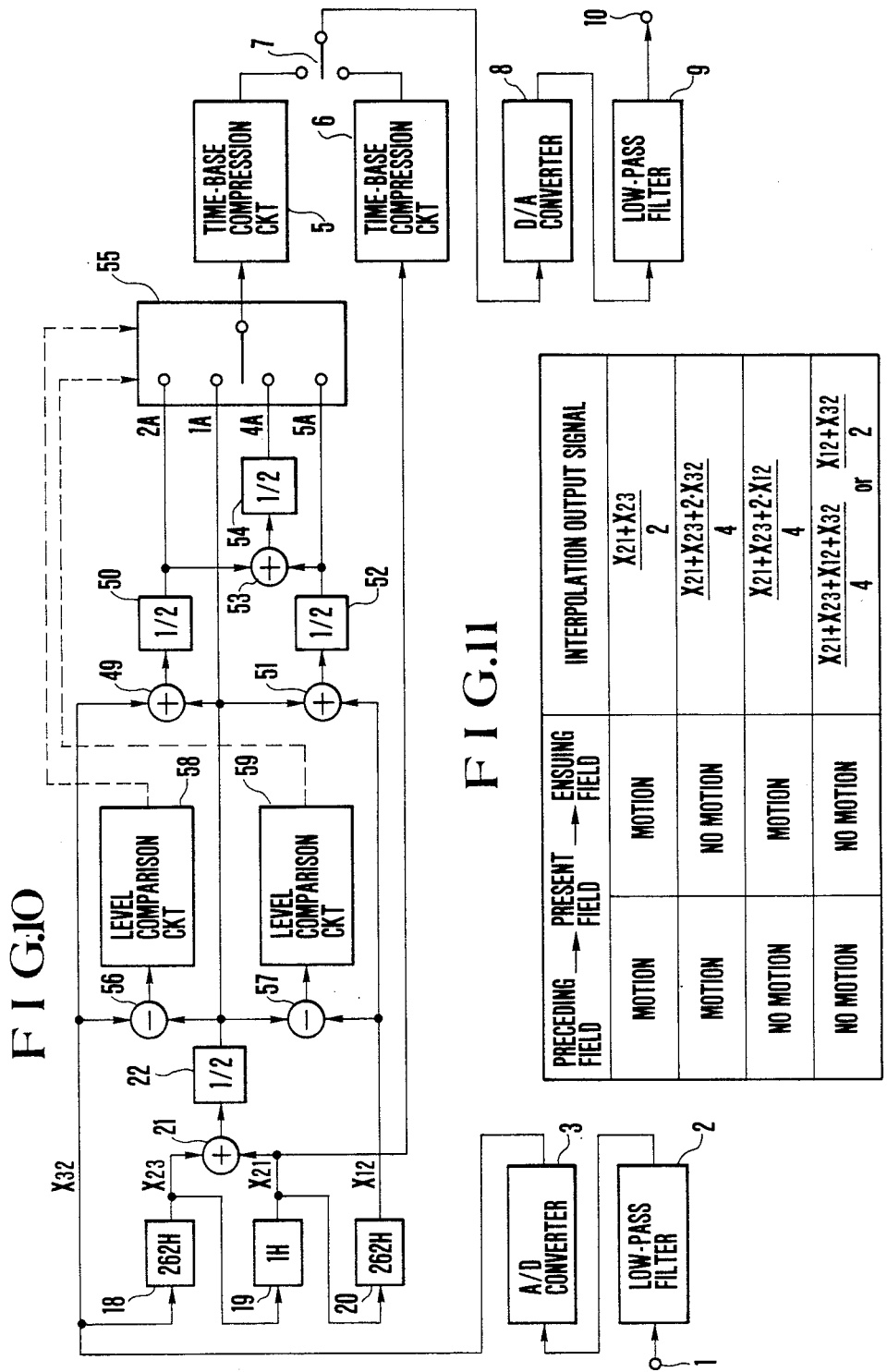

PICTURE SIGNAL CONVERSION DEVICE

BACKGROUND OF THE INVENTION

1. Field of the Invention

This invention relates to a picture signal conversion device for converting the mode of a picture signal into a different mode.

2. Description of the Related Art

In the television signal of the NTSC system of today, a field signal of 262.5 scanning lines is obtained by interlaced scanning every 1/60 sec. for every one field period. A one-frame signal of 525 scanning lines is formed for every two fields. It has been contrived to obtain a high definition signal conversion processing circuit by arranging it to convert the present television signal to have twice as many scanning lines and to have it displayed on a high definition monitor or the like. FIG. 1 of the accompanying drawings shows in a block diagram the basic arrangement of the conventional high definition signal conversion processing circuit. A television signal 1 (an analog signal) which is supplied to an input terminal 1 has its high zone frequency cut off at a low-pass filter 2 and is then converted by an analog-to-digital (A/D) converter 3 into a digital signal. The digital signal is supplied to a first time-base compression circuit 5 and also to a field memory 4. A signal produced from the field memory 4 is supplied to a second time-base compression circuit 6.

The signal from the field memory 4 is a signal for a preceding field. In the case of a 2:1 interlaced scanning method, this signal is a signal for scanning the intermediate scanning lines of the present field. The present field signal which is produced from the A/D converter 3 and the preceding field signal which is thus produced from the field memory 4 is time-base compressed into ½ respectively by time-base compression circuits 5 and 6. The compressed signals from the circuits 5 and 6 are alternately taken out via a changeover switch 7 at every scanning line period. By this arrangement a signal which has a doubled number of scanning lines is supplied to a digital-to-analog (D/A) converter 8 which operates at a sampling frequency twice as high as the operation of the A/D converter 8. An analog signal thus obtained from the D/A converter 8 is allowed to pass through a low-pass filter 9 which has a cut-off frequency thereof arranged to be twice as high as that of the above-stated low-pass filter 2. An output terminal 10 then produces a high definition analog television signal which consists of a doubled number of scanning lines.

FIG. 2 shows in a block diagram a composite color television system to which the above-stated basic arrangement of the prior art circuit is applied. An incoming composite color television signal is received at an input terminal 11. The signal is supplied to a Y/C separation circuit 12 to be divided into a luminance signal Y and a chrominance signal C. The chrominance signal C is demodulated by a color demodulation circuit 13, for example, into color difference signals such as I and Q signals. The luminance signal Y is then processed into a high definition signal to have its number of scanning lines doubled by a signal conversion processing circuit 14 which is arranged as shown in FIG. 1.

The color difference signals I and Q are also likewise processed by another signal conversion processing circuit 15. Following that process, these signals are supplied to a materix circuit 16 along with the high definition processed luminance signal from the circuit 14. The matrix circuit 16 then produces signals R, G and B of the three primary colors for display on a high definition color monitor 17.

Referring to FIG. 3, in the high definition signal conversion processing method for increasing the number of scanning lines by two times, the signal of each scanning line X in between adjacent signals A and B of a present field i is arranged to be obtained as an interpolation signal, for example, either by directly using the signal of a corresponding scanning line X' of a preceding field or by using a signal having a mean value of signals of the scanning lines A and B located above and below the scanning line X.

As exemplified in the foregoing, there have been proposed various methods for obtaining an interpolation signal either by using a scanning line signal of the preceding field or by selectively using scanning line signals of the present field. It is, however, a common basic concept among these various methods to use the scanning line signal of the preceding field for a picture which does not have much motions such as a still picture and to use scanning line signals of the present field for a picture having much motions. In accordance with the above-stated conventional arrangement, a high quality picture is obtainable in cases where the picture is obtained on the basis of information on an image having not much motions. Whereas in the event of a display picture resulting from information on an image having much motions, it has been hardly possible to obtain a picture in a high quality.

FIG. 4 shows another example of the conventional circuit arrangement. In this case, a level difference between picture signals of frames and a fixed threshold value level is compared to detect any movement or motions of an image; scanning line signals of the present field are used for obtaining an interpolation signal if the detected movement is much; and an interpolation signal is obtained from a scanning line signal of an adjacent field if the movement is found not much. In FIG. 4, the same reference numerals as in FIG. 1 are used for indicating parts similar to those shown in FIG. 1. An incoming picture signal is received at an input terminal 1. The incoming signal is supplied via a low-pass filter 2 to an A/D converter 3 to be converted into a digital picture signal. The digital signal produced from the A/D converter 3 is supplied to a 262H- delay circuit 18 (H: one horizontal scanning period). The output of the delay circuit 18 is supplied to a 1H delay circuit 19. The output of the delay circuit 19 is supplied to another 262H delay circuit 20.

Therefore, as shown in FIG. 5, the A/D converter 3 and the delay circuits 18, 19 and 20 produce a scanning line signal X32 (the direct output of the A/D converter 3) for the ensuing field; a scanning line signal X23 (the output of the delay circuit 18) which is for the present field and is delayed 262H; a scanning line signal X21 which is for the present field and is delayed 1H from the signal X23; and a scanning line signal X12 which is for the preceding field and is delayed 262H from the signal X21. The outputs of the 262H delay circuit 18 and the 1H delay circuit 19 are supplied to an adder 21. The output of the adder 21 is supplied to a ½ coefficient circuit 22. The circuit 22 produces a signal of a value (X21+X23)/2.

Further, the output of the A/D converter 3 and that of the 262H delay circuit 20 are supplied to the adder 23. The output of the adder 23 is supplied to another ½ coefficient circuit 24. The circuit 24 produces a signal of a value (X12+X32)/2.

The outputs of the two ½ coefficient circuits 22 and 24 are supplied to a change-over switch 25 which operates under a control signal and are then supplied to a time-base compression circuit 6. Meanwhile, the output X21 of the 1H delay circuit 19 is supplied to another time-base compression circuit 5.

The outputs of the two time-base compression circuits 5 and 6 are supplied to the two input terminals of a switch 7. The change-over output of the switch 7 is supplied to a low-pass filter 9. The output of the low-pass filter 9 is supplied to an output terminal 10.

Referring to FIG. 5, a subtracter 26 is arranged to take out, as a difference signal showing a difference between picture signals of frames, a difference signal representing a difference between the picture signals X12 and X32 of the preceding and ensuing fields. The difference signal thus obtained is supplied to the negative input terminal of a comparator 27. Meanwhile, a fixed reference level signal (Th) is supplied to the positive input terminal of the comparator 27. The level of the difference signal representing the difference between the signals X12 and X32 is compared with the level of the reference level signal at the comparator 27. The comparator 27 thus produces a detection signal indicative of the result of a discrimination made to find out whether the difference signal is at a higher level than the reference level signal. When the detection signal produced from the comparator 27 is at a high level, the incoming picture signal is judged to represent unmoving image information and the connecting position of the switch 25 is shifted to a position on the side of the ½ coefficient circuit 24. When the output of the comparator 27 is at a low level, the incoming picture signal is judged to represent moving image information and the switch 25 is shifted to a position on the side of the other ½ coefficient circuit 22.

In the conventional arrangement described, however, the reference level signal which is supplied to the comparator 27 is at a fixed level. This brings about the following problem: There is a possibility that the comparator 27 might suddenly come to produce its output at a low level while the image information borne by the incoming signal has been judged to have no motions with the output of the comparator 27 produced at a high level at a point several lines (say, 8 lines) before the present interpolation point. This is likely caused by a noise or instability of the circuit arrangement because Generally, such a change from a still state to a moving state seldom takes place. Therefore, it is hardly possible with the circuit arranged as shown in FIG. 4 to accurately detect the motion of an image and to select an optimum interpolation signal.

Further, in cases where the resolution of the device is low and the image teems with noises, the conventional circuit arrangement described above fails to give any adequate effect of a high definition signal conversion process. To solve this problem, there has been proposed a noise removing circuit which is arranged as shown in FIG. 6 to remove noises from a noise-laden television signal by utilizing a frame memory. Referring to FIG. 6, a television signal received at an input terminal 28 is converted into a digital signal by an A/D converter 29. The digital signal thus obtained is supplied to a subtracter 31 which then obtains a difference between the signal and another signal of a preceding frame produced from a frame memory 30. A difference signal thus obtained is multiplied k times ($0 \leq k \leq 1$) at a coefficient integration circuit 32. The signal which is thus multiplied by k times is supplied to an addition circuit 33 to be added to a signal coming from the A/D converter 29.

The output of the addition circuit 33 is supplied to the frame memory 30 and is also to a lowpass filter 35 via a D/A converter 34. In this circuit arrangement, the value k used at the coefficient integration circuit 32 is determined according to the magnitude of the output of the subtraction circuit 31 representing a difference between frames. The value k is arranged to become closer to 1 if the difference signal is small and closer to 0 if the signal is large. By virtue of this arrangement, the output of the addition circuit 33 becomes a picture signal from which noises in the still picture portion thereof have been removed. Meanwhile, in the case of a picture signal having a moving image, however, the noise removing circuit is still remains incapable of solving the problem of having deteriorated resolution. Therefore, even with a high definition signal conversion process carried out after removal of noises by such a noise removing circuit, it is hardly possible to attain adequate effect of the high definition signal conversion process.

SUMMARY OF THE INVENTION

It is a general object of this invention to solve the above-stated problems of the prior art without recourse to complex circuit arrangement.

It is a more specific object of this invention to provide a picture signal conversion device which is capable of accurately generating an interpolation signal even for a picture signal showing motions on a display picture and is thus capable of converting such picture signal of a high quality.

Under this object, a preferred embodiment of this invention is a picture signal conversion device arranged to obtain an interpolation signal by using a scanning line signal of a first picture signal which has scanning line signals corresponding to a predetermined number of scanning lines within one field period and to convert the first picture signal into a second picture signal which has a greater number of scanning lines than that of the first picture signal comprises: first interpolation signal generating means which generates a first interpolation signal for the present field by using a scanning line signal obtained within the present field; second interpolation signal generating means which generates a second interpolation signal for the present field by using a scanning line signal of another field; output means arranged to detect the correlativity of scanning line signals between fields and to selectively produce, according to the detected correlativity, the first or second interpolation signal generated from the first or second interpolation signal generating means; and detection characteristic control means for controlling the correlativity detecting characteristic of the output means according to the inclination of the correlativity detected from among scanning line signals obtained within a predetermined period.

It is another object of this invention to provide a picture information signal conversion device which is capable of generating an optimum interpolation signal for a picture information signal showing motions on a display picture and is capable of converting the picture information signal into a high definition picture signal by using the optimum interpolation signal.

Under that object, another embodiment of this invention is a picture signal conversion device which is arranged to obtain an interpolation signal by using a scanning line signal of a first picture signal which has scanning line signals corresponding to a predetermined number of scanning lines within one field period and to convert the first picture signal into a second picture signal which has a greater number of scanning lines than that of the first picture signal comprises: first interpolation signal generating means which generates a first interpolation signal for the present field by using a scanning line signal obtained within the present field; second interpolation signal generating means which generates a second interpolation signal for the present field by using a scanning line signal of another field; third interpolation signal generating means which generates a third interpolation signal for the present field by using a scanning line signal of another field immediately preceding the present field; first mixing means for mixing the first interpolation signal generated by the first interpolation signal generating means and the third interpolation signal generated by the third interpolation signal generating means; second mixing means for mixing the second interpolation signal generated by the second interpolation signal generating means and the third interpolation signal generated by the third interpolation signal generating means; and mixing ratio control means arranged to detect the correlativity of scanning lines among different fields and to control the mixing ratio in which the third interpolation signal is mixed by the first and second mixing means according to the correlativity detected.

It is a further object of this invention to provide a picture signal conversion device which is capable of converting a picture information signal showing motions on a display picture into a high definition picture signal of a high degree of resolution without being affected by noises and the like.

Under this object, a further embodiment of this invention is a picture signal conversion device arranged to obtain an interpolation signal by using a scanning line signal of a first picture signal which has scanning line signals corresponding to a predetermined number of scanning lines within one field period and to convert the first picture signal into a second picture signal which has a greater number of scanning lines than that of the first picture signal comprises: first interpolation signal generating means which generates a first interpolation signal for the present field by using a scanning line signal obtained within the present field; second interpolation signal generating means which generates a second interpolation signal by using at least a scanning line signal of another field; third interpolation signal generating means for generating a plurality of different third interpolation signals by utilizing at least either of said first and second interpolation signals; first correlativity detecting means for detecting correlativity between the scanning line signal of the present field and the scanning line signal of another field immediately preceding the present field; second correlativity detecting means for detecting correlativity between the scanning line signal of the present field and that of another field immediately ensuing the present field; and output means for selectively producing one of the interpolation signals generated by said third interpolation signal generating means, one of the third interpolation signals being selected according to the results of detection made by the first and second correlativity detecting means.

These and further objects and features of this invention will become apparent from the following detailed description of embodiments thereof taken in connection with the accompanying drawings.

BRIEF DESCRIPTION OF THE DRAWINGS

FIG. 1 is a block diagram showing the basic arrangement of the conventional high definition signal conversion processing circuit.

FIG. 2 is a block diagram showing a composite color television system employing the conventional circuit arrangement FIG. 1.

FIG. 3 is an illustration of a manner in which scanning lines within fields are interpolated by the circuit of FIG. 2.

FIG. 4 is a block diagram showing in outline the arrangement of the conventional picture signal conversion device including an interpolation signal selection arrangement.

FIG. 8 is a block diagram showing in outline the arrangement of a picture signal conversion device arranged as another embodiment of this invention.

FIG. 9 is an illustration of a relation between the motions of images and interpolation output signals obtained by the device of FIG. 8.

FIG. 10 is a block diagram showing in outline the arrangement of a picture signal conversion device arranged as a further embodiment of this invention.

FIG. 11 is an illustration of a relation between the motions of images and interpolation signals obtained by the device of FIG. 10.

DETAILED DESCRIPTION OF THE PREFERRED EMBODIMENTS

Figure 5:
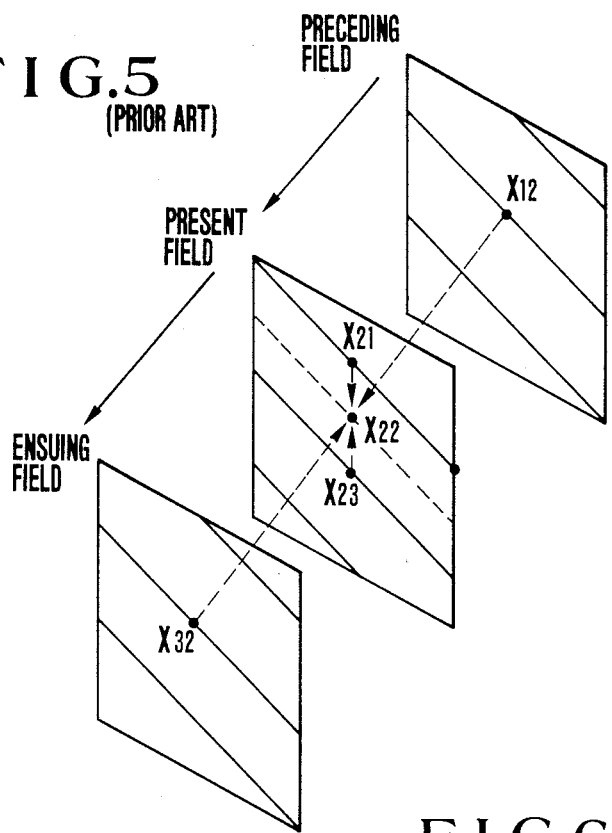
FIG. 5 is an illustration showing scanning line interpolation to be effected among fields by the device of FIG. 4.
Figure 6:
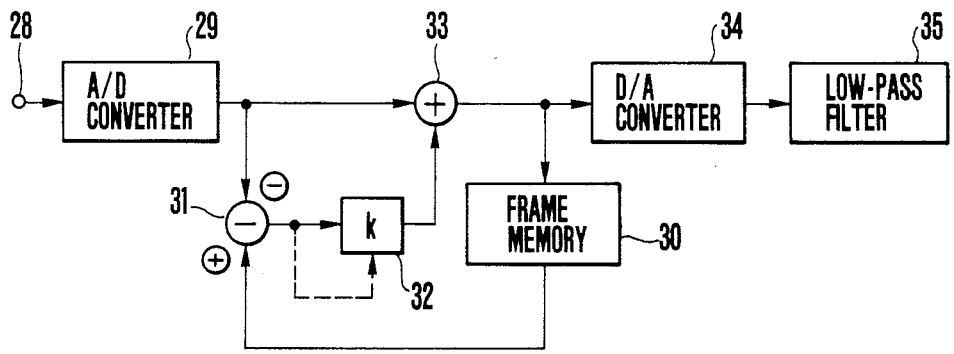
FIG. 6 is a block diagram of a conventional noise removing circuit.
Figure 7:
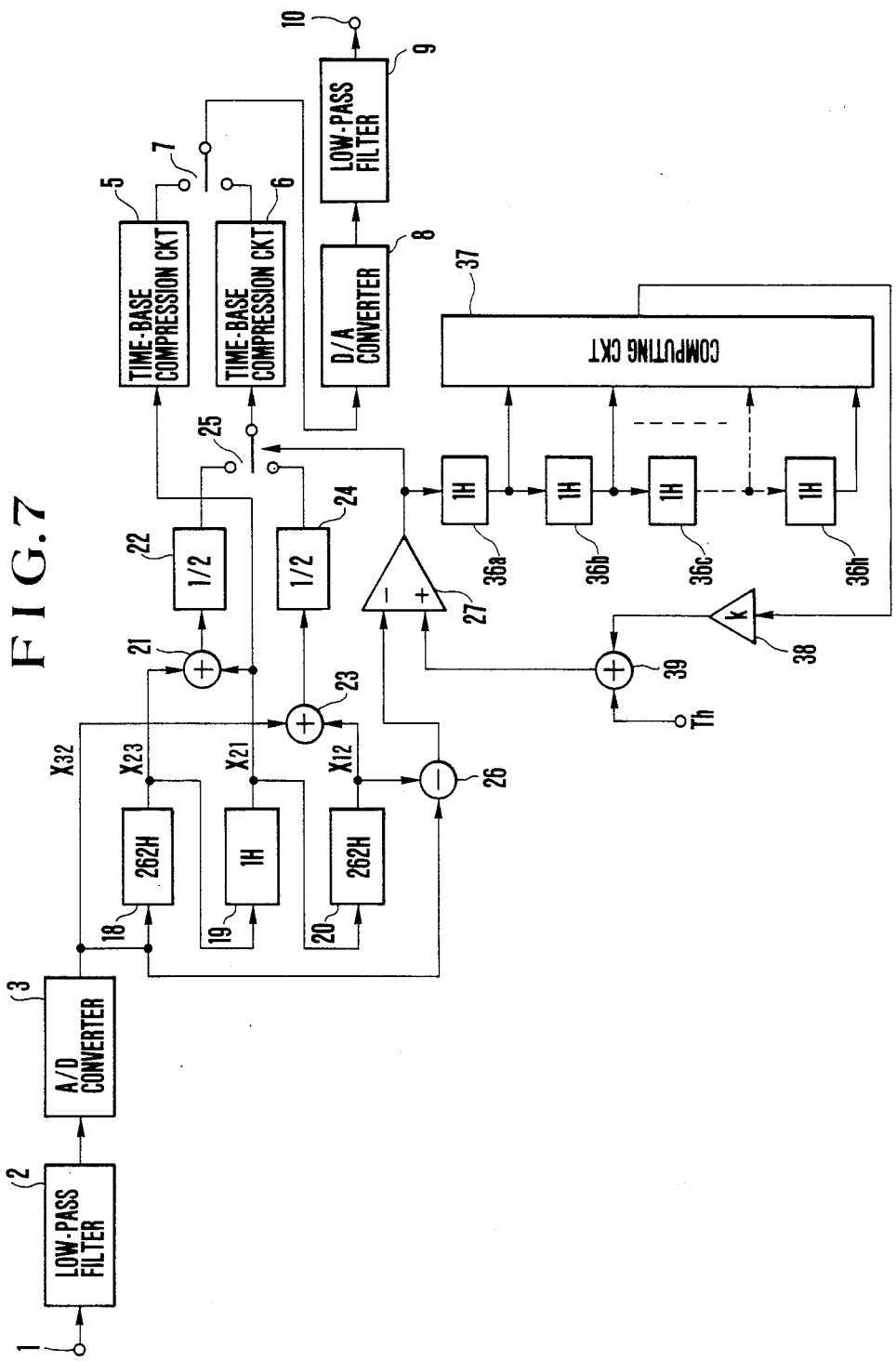
FIG. 7 is a block diagram showing in outline the arrangement of a picture signal conversion device arranged as an embodiment of this invention.

Preferred embodiments of this invention are arranged as described below with reference to the accompanying drawings:

FIG. 7 shows in outline a picture signal conversion device arranged as an embodiment of this invention. In FIG. 7, the parts similar to these shown in FIG. 4 are indicated by the same reference numerals. An analog picture signal which is received at an input terminal 1 is supplied via a low-pass filter 2 to an A/D converter 3 to be converted into a digital picture signal there. The digital signal produced from the A/D converter 3 is supplied to a 262H delay circuit 18 (H: one horizontal period). The output of this circuit 18 is supplied to a 1H delay circuit 19. The output of the delay circuit 19 is further supplied to another 262H delay circuit 20. Therefore, as shown in FIG. 5, the A/D converter 3 and the delay circuits 18, 19 and 20 produce a scanning line signal X32 (the output of the A/D converter 3) showing picture information of the ensuing field; a scanning line signal X23 (the output of the delay circuit 18) which is for the present field and is delayed 262H; a scanning line signal X21 which is for the present field and is obtained by delaying the signal X23 as much as 1H; and a scanning line signal X12 which is for the preceding field and obtained by delaying the signal X21 as much as 262H. The outputs of the 262H delay circuit 18 and the 1H delay circuit 18 are supplied to an adder 21. The output of the adder 21 is supplied a ½ coefficient integration circuit 22. The circuit 22 produces a signal of a value (X21+X23)/2. The output of the A/D converter 3 and that of the 262H delay circuit 20 are supplied to an adder 23. The output of the adder 23 is supplied to a ½ coefficient integration circuit 24. The circuit 24 produces a signal of a value (X12+X32)/2. A switch 25 is arranged to supply the outputs of the two ½ coefficient integration circuits 22 and 24 to a time-base compression circuit 6 by switching these outputs from one over to the other under the control of a control signal which will be described later. Meanwhile, the output X21 of the 1H delay circuit 19 is supplied to another time-base compression circuit 5.

The outputs of the two time-base compression circuits 5 and 6 are supplied to two input terminals of a switch 7. The switch 7 supplies these outputs via D/A converter 8 to a low-pass filter 9 by switching them from one over to the other. The output of the low-pass filter 9 is supplied to an output terminal 10.

A signal produced from a subtracter 26 is supplied to the negative input terminal of a comparator 27. The connecting position of the switch 25 is under the control of the output of the comparator 27. The switch is thus shifted to the side of the ½ coefficient integration circuit 24 when the output of the comparator 27 is at a high level and to the side of the other ½ coefficient integration circuit 22 when the output is at a low level. The output of the comparator 27 is supplied also to eight 1H delay circuits 28a to 28h which are connected in series. The output signal of the comparator 27 which is delayed by each of these 1H delay circuits is supplied to a computing circuit 37 as input signals thereto. The circuit 37 produces a signal the level of which varies according to the number of high level signal inputs. The signal produced from the computing circuit 37 is supplied to a coefficient integration circuit 38 to be integrated up to a coefficient k and, after that, is added to a fixed reference threshold value level Th at an adder 39. The output of the adder 39 is then supplied to the positive input terminal of the comparator 27 as a reference voltage to be used for comparison.

The computing circuit 37 is arranged to perform a +1 accumulating operation on the eight input signals when they are at a high level and to perform a −1 accumulating operation when they are at a low level. In other words, the computing operation of the computing circuit 27 is performed on the outputs of the comparator 27 obtained for eight lines immediately preceding the present point of time to find a difference between the number of high level signal inputs and that of low level signal inputs. For example, the difference is computed as +8 if the number of high level input signals is 8 and that of low level input signals is 0 and as 0 if both the numbers of high and low level input signals are 4. The value of the fixed reference threshold level Th is thus varied according to the output of the computing circuit 37. As a result of this arrangement, the comparator 27 has its reference voltage obtained by consolidating the results of discrimination made by the comparator 27 for a plurality of lines immediately preceding the present point of time. This arrangement effectively prevents noises from mixing in and ensures that an optimum interpolation signal is selected by means of the switch 25.

Further, in accordance with this invention, the input reference threshold level Th to the comparator 27 may be arranged to be increased when a more than a certain number n of high level signal are consecutively produced from the comparator 27 or to be decreased when a more than the number n of low level signals are consecutively produced.

The picture signal conversion device which is arranged as described above is capable of converting an ordinary picture signal into a high definition picture signal without being affected by noises or the like.

Another embodiment of this invention is arranged as follows: FIG. 8 shows the outline of the embodiment. In FIG. 8, the same parts as those shown in FIG. 4 are indicated by the same reference numerals. An analog picture signal received at an input terminal 1 is supplied via a low-pass filter 2 to an A/D converter 3 and is converted into a digital picture signal. The digital signal thus produced from the A/D converter 3 is supplied to a 262H (H: one horizontal period) delay circuit 18. The output of the circuit 18 is supplied to a 1H delay circuit 19. The output of the delay circuit 19 is further supplied to another 262H delay circuit 20. As a result, the A/D converter 3 and the delay circuits 18, 19 and 20 produce a scanning line signal X32 representing image information for an ensuing field (the direct output of the A/D converter 3), a scanning line signal X23 (the output of the delay circuit 18) which is delayed by 262H for the present field, a scanning line signal X21 which is for the present field and is obtained by delaying the signal X23 by 1H and a scanning line signal X12 which is for a preceding field and is obtained by delaying the signal X21 by 262H as shown in FIG. 5.

The output of the 262H delay circuit 18 and that of the 1H delay circuit 19 are supplied to an adder 21. The output of the adder 21 is supplied to a ½ coefficient integration circuit 22. The circuit 22 then produces a signal of (X21+X23)/2. Meanwhile, the output of the A/D converter 3 and that of the 262H delay circuit 20 are supplied to an adder 23. The output of the adder 23 is supplied to another ½ coefficient integration circuit 24. The circuit 24 then produces a signal of (X12+X32)/2. The output (X21+X23)/2 of the ½ coefficient integration circuit 22 is supplied to a subtracter 40 and an adder 41. The output (X12+X32)/2 of the other ½ coefficient integration circuit 24 is likewise supplied to input terminals of a subtracter 42 and an adder 43. To other input terminals of these subtracters 40 and 42 is supplied the output signal X12 of the 262H delay circuit 20. The outputs of these subtracters 40 and 42 are supplied via coefficient integration circuits 44 and 45 to adders 41 and 43 respectively. The outputs of the adders 41 and 43 are arranged to be supplied to the input terminals of a switch 46 which has its connecting position shifted according to detection or no detection of the motions of the incoming picture signal as will be further described later.

Meanwhile, the output X32 of the A/D converter 3 and the output S12 of the 262H delay circuit 20 are supplied to a subtraction circuit 47. The circuit 47 then obtains a level difference between the signal X12 and the signal X32 which has been delayed by one frame period as shown in FIG. 5. A level difference signal which is thus obtained is supplied to a motion detecting circuit 48. The motion detecting circuit 48 detects the motion of images between two consecutive frames on the basis of the value of the difference signal supplied thereto. The detecting circuit 48 then produces a control signal on the basis of the result of detection.

The control signal produced from the motion detecting circuit 48 shifts the connecting position of the above-stated change-over switch 46 to the output side of the adder 43 if the detected image motion is small and to the output side of the adder 41 in the event of a large image motion. In addition to that, the control signal also serves to control the coefficient k of the coefficient integration circuits 44 and 45 according to the motion of the image in a manner as will be described later.

The image motion detecting operation at the motion detecting circuit 48 is performed on the basis of the difference signal which is supplied as mentioned above.

In other words, the motion detecting circuit 48 controls the two coefficient integration circuits 44 and 45 and the switch 46 in a manner as described below:

(i) When the image has little motion, the switch 46 is connected to the adder 43 and the coefficient k of the coefficient integration circuit 45 is controlled to be close to 0. As a result, the switch 46 produces a signal which can be expressed as (X32+X12)/2.

(ii) When the image changes from a state of having almost no motion toward a state of having a medium degree of motion, the coefficient k of the coefficient integration circuit 45 is controlled to come from 0 toward 1 and the switch 46 produces a signal at a value intermediate between (X32+X12)/2 and X12.

(iii) When the motion of the image becomes the medium degree, the coefficient k of the coefficient integration circuit 45 is controlled to become 1 and the switch 46 produces a signal of the value X12.

(iv) When the motion of the image further increases from the degree of paragraph (iii) above, the switch 46 is connected to the other adder 41. The coefficient k of the coefficient integration circuit 44 is controlled to change from 1 toward 0. The switch 46 then produces a signal at a value intermediate between X12 and X21+X23/2.

(v) When the image comes to have a large motion, the coefficient k of the coefficient integration circuit 44 is controlled to become 0. The switch 46 produces a signal of a value (X21+X23)/2.

In short, an interpolation signal is obtained by using the signals of the present field if the image has a large motion; an interpolation signal is obtained by using a signal of only the preceding field if the image has a medium motion; and an interpolation signal is obtained by using not only the signal of the preceding field but also a signal of the ensuing field correlated time-wise in the event of little motion. The relation of the image motions to the interpolation signal which is produced from the switch 46 is as shown in FIG. 9.

The time-base compression circuits 5 and 6 which are arranged in a manner similar to the example described in the foregoing receive the output of the switch 46 and that of the 262H delay circuit 20 respectively. These input to the circuits 5 and 6 are timebase compressed and are supplied to a switch 7. The output of the switch 7 is supplied via a D/A converter 8 to a low-pass filter 9. A signal produced from the lowpass filter 9 is supplied to an output terminal 10 as a high definition signal having a doubled number of scanning lines.

In the case of the picture signal conversion device of this embodiment, an optimum interpolation signal is obtainable according to the magnitude of the motions of the images, so that a picture signal of a low degree of resolution can be effectively converted into a high definition picture signal.

FIG. 10 shows in outline the arrangement of a picture signal conversion device which is arranged as a further embodiment of this invention. In FIG. 10, the parts which are the same as those shown in FIG. 4 are indicated by the same reference numerals as in FIG. 4. Referring to FIG. 10, an analog picture signal received at an input terminal 1 is supplied via a lowpass filter 2 to an A/D converter 3. A digital signal thus obtained from the A/D converter 3 is supplied to a 262H (H: one horizontal period) delay circuit 18. The output of the delay circuit 18 is supplied to a 1H delay circuit 19. The output of the 1H delay circuit 19 is supplied to another 262H delay circuit 20. Such being the arrangement, the A/D converter 3 and the delay circuits 18, 19 and 20 respectively produce, as shown in FIG. 5, a scanning line signal X32 which is directly produced from the converter 3 to show the picture information on an ensuing field; a scanning line signal X23 which is for the present field and is produced from the circuit 18 by delaying 262H the signal X32; a scanning line signal X21 which is for the present field and is produced from the circuit 19 by delaying 1H the signal X23; and a scanning line signal X12 which is for a preceding field and is produced from the circuit 20 by delaying 262H the signal X21.

The output of the 262H delay circuit 18 and that of the 1H delay circuit 19 are suppled to an adder 21. The output of the adder 21 is supplied to a ½ coefficient integration circuit 22, which then produces a signal of a value (X21+X23)/2.

The output signal (X21+X23)/2 of the ½ coefficient integration circuit 22 is supplied to an adder 49 to be added together with the output signal X32 of the A/D converter 3. The output of the adder 49 is supplied to another ¼ coefficient integration circuit 50. The circuit 50 then produces a signal of a value ¼ (X21+X23+2.X32). The output (X21+X23)/2 of the ½ coefficient integration circuit 22 is supplied to an adder 51 to be added together with the output X12 of the 262H delay circuit 20. The output of the adder 51 is supplied to a ¼ coefficient integration circuit 52. The circuit 52 then produces a signal of a value ¼(X21 X23+2.X12). The output signals from the two ¼ coefficient integration circuits 50 and 52 are supplied to an adder 53. The output of the adder 53 is supplied to another ½ coefficient integration circuit 54. The circuit 54 then produces a signal of a value which can be expressed as ¼ (X21+X23+X12+X32).

The signals produced from these ½ coefficient integration circuits 22, 50, 52 and 54 are supplied to four input terminals 1A, 2A, 3A and 4A of a switch 55 which is arranged to perform a switch-over operation on these inputs under the control of a control signal which will be described later.

The output (X21+X23)/2 of the above-stated ½ coefficient integration circuit 22 is supplied to a subtracter 56 to obtain a difference between it and the output X32 of the A/D converter 3 and to another subtracter 57 to obtain a difference between it and the output X12 of the 262H delay circuit 20. The outputs of these subtracters 56 and 57 representing the above-stated differences are supplied respectively to level comparators 58 and 59. The difference signals thus obtained from the subtracters 56 and 57 are thus used for detecting the magnitude of the motions of images existing between the consecutive fields.

In other words, as shown in FIG. 5, with an interpolation signal $(X21+X23)/2$ obtained at a position X22 within the present field by means of upper and lower scanning line signals, a difference signal representing a difference between the interpolation signal and a signal X32 located at a corresponding position in the ensuing field is supplied to the level comparison circuit 58. Meanwhile, a difference signal representing a difference between the interpolation signal $(X21+X23)/2$ and a signal X12 which is at a corresponding position within the preceding field is supplied to another level comparison circuit 59. Then, these difference signals are compared with the threshold value of a predetermined level set at these circuits 58 and 59. These level comparison circuits 58 and 59 then produce high level signals when these difference signals are at higher levels than the threshold value and low level signals when the difference signals are at levels lower than the threshold value.

The switch 55 is arranged to operate as follows: In case that both the level comparison circuits 58 and 59 produce high level outputs, the image or picture is determined to have motions both at a transient point from the preceding field to the present field and from the present field to the ensuing field. In that case, the switch 55 is connected to the input terminal 1A thereof. If the output signal of the level comparison circuit 59 is at a low level while that of the other comparison circuit 58 is at a high level, the image or picture is determined to have a motion between the preceding field and the present field while it has no motion between the present field and the ensuing field. In this instance, the switch 55 is connected to the input terminal 2A. If the output signal of the level comparison circuit 59 is at a high level while that of the other circuit 58 is at a low level, it is determined that there is no motion between the preceding field and the present field while there is a motion between the present and ensuing fields. Then, the switch is connected to the input terminal 3A. If both the output signals of the level comparison circuits 58 and 59 are at low levels, both the transient parts from the preceding field to the present field and from the present field to the ensuing field are determined to have no motion. In that instance, the connecting position of the switch 55 is shifted to the input terminal 4A.

FIG. 11 shows the relation of the motions of the image to the interpolation signals produced from the switch 55.

Time-base compression circuits 5 and 6 are arranged to receive the output of the above-stated switch 55 and that of the 1H delay circuit 19 respectively. The circuits 5 and 6 time-base compress these inputs into ½ signals respectively. The time-base compressed signals from the circuits 5 and 6 are supplied to a switch 7. The output of the switch 7 is supplied via a D/A converter 8 to a low-pass filter 9. The output of the low-pass filter 9 is then supplied to an output terminal 10 as a high definition signal having a doubled number of scanning lines. In the case of FIG. 10, the outputs of the ½ coefficient integration circuits 50 and 52 are added up by the adder 53. However, this arrangement may be changed to have the output X32 of the A/D converter 3 and the output X12 of the 262H delay circuit 20 added together. In the case of that modification, the signal to be supplied to the input terminal 4A becomes of a value ½ $(X12+X32)$.

The picture signal conversion device of this embodiment is capable of obtaining an optimum interpolation signal according to the magnitude of the image motions. Therefore, even a picture signal of a low degree of resolution can be converted into a high definition picture signal of an improved picture quality.

Figure 12:
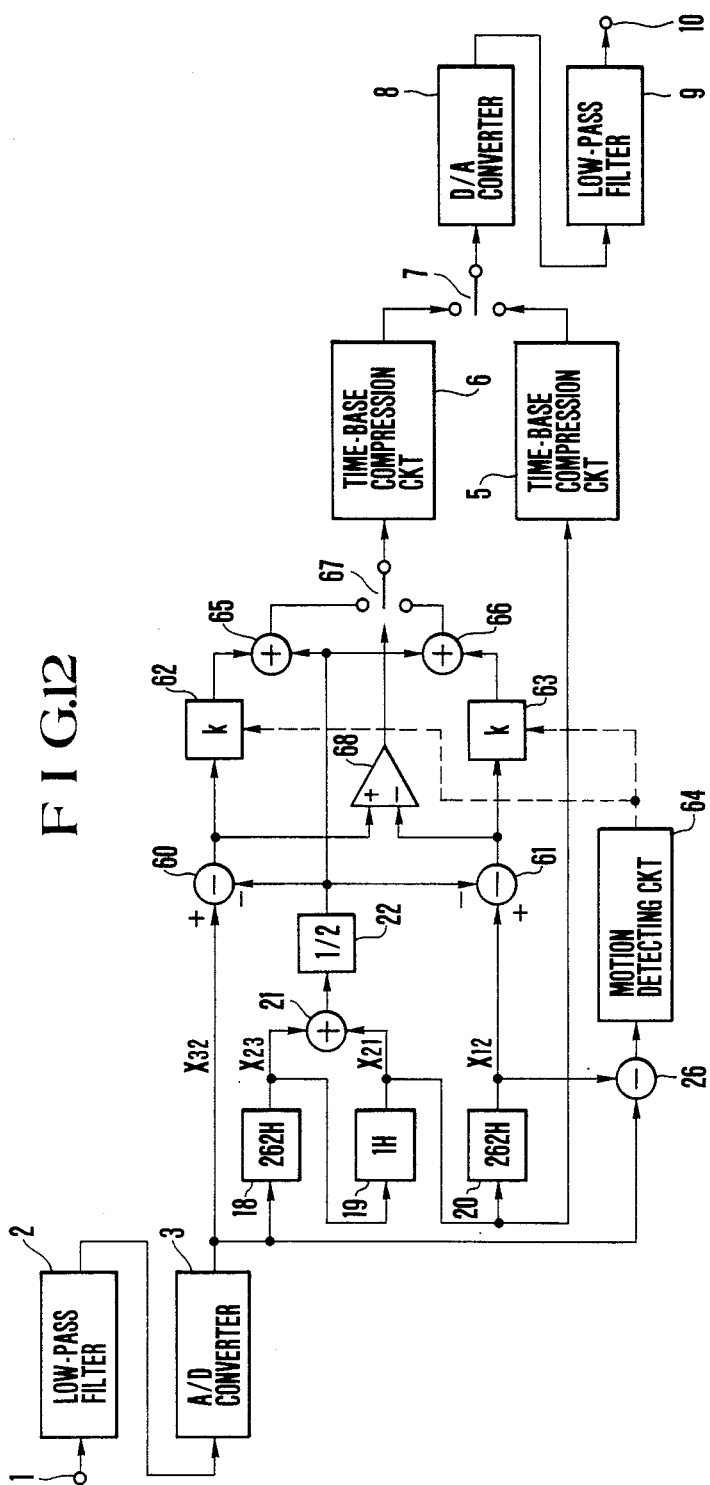
FIG. 12 is a block diagram showing in outline a picture signal conversion device arranged as a still further embodiment of this invention.

FIG. 12 shows in outline a picture signal conversion device arranged as a still further embodiment of this invention. The same parts as those shown in FIG. 4 are indicated by the same reference numerals as in FIG. 4. Referring to FIG. 12, an analog picture signal which is received at an input terminal 1 is supplied to an A/D converter 3 via a low-pass filter 2. The output of the A/D converter 3 is supplied to a 262H delay circuit 18 (H: one horizontal period). The output of the delay circuit 18 is supplied to a 1H delay circuit 19. The output of the 1H delay circuit 19 is supplied to another 262H delay circuit 20. Therefore, as shown in FIG. 5, this arrangement gives a scanning line signal X32 which represents image information of an ensuing field; a scanning line signal X23 which is for the present field and is delayed by 262H (the output of the delay circuit 18); a scanning line signal X21 which is also for the present field and is obtained by delaying the signal X23 by 1H; and a scanning line signal X12 which is for the preceding field and is obtained by delaying the signal X21 by 262H.

The output of the 262H delay circuit 18 and that of the 1H delay circuit 19 are supplied to an adder 21. The output of the adder 21 is supplied to a ½ coefficient integration circuit 22. The circuit 22 then produces a signal of a value which can be expressed as $(X21+X23)/2$. The output signal of the circuit 22 is supplied to a subtracter 60 to be subtracted from the output X32 of the above-stated A/D converter 3 and is supplied also to another subtracter 61 to be subtracted from the output X12 of the 262H delay circuit 20.

The outputs of two subtracters 60 and 61 are supplied to coefficient integration circuits 62 and 63. The circuits 62 and 63 are arranged to have a coefficient k $(0 \leq k \leq 1)$. The coefficient k is arranged to become closer to 0 according as the magnitude of the motions of the images increases and closer to 1 according as the image motions decrease. The outputs of the two coefficient integration circuits 62 and 63 are added to the output of the above-stated ½ coefficient integration circuit 22 at adders 65 and 66 respectively. The outputs of the two adders 65 and 66 are supplied to a switch 67. The switch 67 performs a switch-over operation on the outputs of these outputs of the adders under the control of the output of a comparator 68, which are arranged to compare the outputs of the two subtracters 60 and 61. In other words, as shown in FIG. 5, a difference $((X21+X23)/2-X32)$ between the signal $(X21+X23)/2$ of the present field produced from the ½ coefficient integration circuit 22 and the signal X32 of the corresponding point of the ensuing field produced from the A/D converter 3 is compared by the comparator 68 with a difference $((X21+X23)/2-X12)$ between the signal $(X21+X23)/2$ of the present field and the signal X12 which is of the corresponding point in the preceding field and is produced from the 262H delay circuit 20. The comparison is made to find which of the signals of the preceding and ensuing fields has a greater correlativity with the signal of the present field. The connecting position of the switch 67 is shifted according to the result of this comparison. For example, in case that the above-stated differences are in the relation of $(X21+X23)/2-X32 > (X21+X23)/2-X12$, the signals $(X21+X23)/2$ and X12 are considered to have a greater correlativity and the switch 67 is connected to the adder 66.

In this manner, in generating a scanning line interpolation signal of the present field, a discrimination is made to find which of the preceding and ensuing fields has a correlativity with the present field. Noises are thus removed by utilizing the signal of the field which has a greater degree of correlativity with the present field. This arrangement ensures that a picture signal which has motions and is of a low quality can be improved in picture quality.

Further, to obtain a signal indicative of a difference between two consecutive frames, a difference between the output X32 of the A/D converter 3 and the output X12 of the 262H delay circuit 20 is obtained by computation at the subtracter 26. Then, on the basis of the result of this computation, the motion detecting circuit 64 detects any motion of the image that takes place between the frames. The detection of the image motion at the motion detecting circuit 64 is accomplished mainly according to the value of the difference signal received. The coefficient k of the coefficient integration circuits 62 and 63 is arranged to become closer to 0 according as the magnitude of the image motion increases between the frames and to become closer to 1 according as it decreases.

The output of the switch 67 is supplied to a time-base compression circuit 6 for obtaining an interpolation signal. Meanwhile, the output X21 of the 1H delay circuit 19 is supplied to another time-base compression circuit 5. The outputs of the time-base compression circuits 5 and 6 are supplied via a switch 7 to a D/A converter 8. The output of the converter is supplied via a low-pass filter 9 to an output terminal 10 as a high definition signal having a doubled number of scanning lines.

The picture signal conversion device of this embodiment described above is capable of converting a picture signal of a low quality teeming with noises into a high definition picture signal of an improved quality.

What is claimed is:

1. A picture signal conversion device arranged to obtain an interpolation signal by using a scanning line signal corresponding to a predetermined number of scanning lines within one field period and to covert said first picture signal into a second picture signal which has a greater number of scanning lines than that of said first picture signal, comprising:
   (a) first interpolation signal generating means which generates a first interpolation signal for the present field by using a scanning line signal obtained within the present field;
   (b) second interpolation signal generating means which generates a second interpolation signal for the present field by using scanning line signals of other fields;
   (c) correlativity detecting means for detecting correlativity between scanning line signals of other fields by comparing a difference in signal level between said scanning line signals of the other fields and a threshold level;
   (d) output means arranged to selectively output said first or second interpolation signal generated from said first or second interpolation signal generating means, in accordance with the correlativity detected by said correlativity detecting means; and
   (e) threshold control means for controlling said threshold level in accordance with a variation of the correlativity detected by said correlativity detecting means within a predetermined period.

2. A picture signal conversion device according to claim 1, wherein said threshold level control means includes a ratio computing circuit which is arranged to delay a result of detection progressively produced at said correlativity detecting means and compute a ratio of largeness and smallness of the correlativity within said predetermined period, on the bases of the delayed result of detection, and said threshold control means is arranged to control said threshold level to be compared with the difference in signal level between said scanning line signals of other fields in said correlativity detecting means.

3. A device according to claim 1, wherein said first interpolation signal generating means is arranged to generate the average value of levels of scanning line signals corresponding to two adjacent scanning lines as said first interpolation signal; and said second interpolation signal generating means is arranged to generate as the second interpolation signal the average value of levels of scanning line signals corresponding to two scanning lines of a field immediately preceding the present field and a field immediately ensuing the present field.

4. A picture signal conversion device arranged to obtain an interpolation signal by using a scanning line signal of a first picture signal which has scanning line signals corresponding to a predetermined number of scanning lines within one field period and to convert said first picture signal into a second picture signal which has a greater number of scanning lines than that of said first picture signal, comprising:
   (a) first interpolation signal generating means which generates a first interpolation signal for the present field by using a scanning line signal obtained within the present field;
   (b) second interpolation signal generating means which generates a second interpolation signal for the present field by using scanning line signals of other fields;
   (c) third interpolation signal generating means for generating a third interpolation signal for the present field, using a scanning line signal in another field preceding the present field;
   (d) first mixing means for mixing said first interpolation signal generated by said first interpolation signal generating means and said third interpolation signal generated by said third interpolation signal generating means;
   (e) second mixing means for mixing the second interpolation signal generated by said second interpolation signal generating means and the third interpolation signal generated by said third interpolation signal generating means; and
   (f) mixing ratio control means arranged to detect the correlativity of scanning lines among different fields and to control a mixing ratio in which the third interpolation signal is mixed by said first and second mixing means according to the correlativity detected.

5. A device according to claim 4, wherein said first mixing means includes a first level varying circuit which is arranged to vary the level of said third interpolation signal.

6. A device according to claim 5, wherein said second mixing means includes a second level varying circuit which is arranged to vary the level of said third interpolation signal.

7. A device according to claim 6, wherein said mixing ratio control means is arranged to vary the level of the third interpolation signal by controlling said first and second level varying circuits according to the correlativity between the scanning line signals of different fields.

8. A device according to claim 6, wherein said first level varying circuit includes a first coefficient integration circuit which is arranged to multiply the level of said third interpolation signal by k times.

9. A device according to claim 8, wherein said second level varying circuit includes a second coefficient integration circuit which is arranged to multiply the level of said third interpolation signal by k times.

10. A device according to claim 9, wherein said mixing ratio control means is arranged to vary between 0 and 1 a coefficient k to be used in integrating said third interpolation signal at said first and second coefficient integration circuits according to the correlativity between scanning line signals of different fields.

11. A device according to claim 4, wherein said first mixing means includes a first subtraction circuit which performs a subtracting operation on said first and third interpolation signals; and a first addition circuit which is arranged to vary the level of the output of said first subtraction circuit and to add said output to said first interpolation signal.

12. A device according to claim 11, wherein said second mixing means includes a second subtraction circuit which performs a subtracting operation on said second and third interpolation signals; and a second addition circuit which is arranged to vary the level of the output of said second subtraction circuit and to add said output to said second interpolation signal.

13. A device according to claim 4, wherein said third interpolation signal generating means is arranged to generate the third interpolation signal of the present field by using only the scanning line signal of a field immediately preceding the present field.

14. A picture signal conversion device arranged to obtain an interpolation signal by using a scanning line signal of a first picture signal which has scanning line signals corresponding to a predetermined number of scanning lines within one field period and to convert said first picture signal into a second picture signal which has a greater number of scanning lines than that of said first picture signal, comprising:
  (a) first interpolation signal generating means which generates a first interpolation signal for the present field by using a scanning line signal obtained within the present field;
  (b) second interpolation signal generating means which generates a second interpolation signal by using at least a scanning line signal of another field;
  (c) third interpolation signal generating means for generating a plurality of different third interpolation signals by utilizing at least either of said first and second interpolation signals;
  (d) first correlativity detecting means for detecting correlativity between the scanning line signal of the present field and the scanning line signal of another field immediately preceding the present field;
  (e) second correlativity detecting means for detecting correlativity between the scanning line signal of the present field and that of another field immediately ensuing the present field; and
  (f) output means for selectively producing one of the interpolation signals generated by said third interpolation signal generating means, one of the third interpolation signals being selected according to the results of detection made by said first and second correlativity detecting means.

15. A device according to claim 14, wherein said third interpolation signal generating means is arranged to generate a first inter-field interpolation signal which is generated without using any scanning line signal of the field ensuing the present field and to generate a second inter-field interpolation signal which is generated without using any scanning line signal of the field preceding the present field.

16. A device according to claim 15, wherein said third interpolation signal generating means is arranged to generate an interpolation signal by using scanning line signals corresponding to two adjacent scanning lines of the present field.

17. A device according to claim 16, wherein said third interpolation signal generating means is further arranged to generate an interpolation signal which is obtained by using the scanning line signal of the field preceding the present field and the scanning line signal of the field ensuing the present field.

18. A device according to claim 14, wherein said first correlativity detecting means includes a first level difference signal generating circuit which is arranged to generate a first level difference signal according to a level difference between the scanning line signal of the present field and the scanning line signal of the field immediately preceding the present field.

19. A device according to claim 18, wherein said second correlativity detecting means includes a second level difference signal generating circuit which generates a second level difference signal according to a level difference between the scanning line signal of the present field and the scanning line signal of the field immediately ensuing the present field.

20. A device according to claim 19, wherein said output means is arranged to selectively produce an interpolation signal according to said first and second level difference signals.

21. A device according to claim 20, wherein said first correlativity detecting means includes a reference level signal generating circuit which generates a reference level signal; and a first switch-over control signal generating circuit which is arranged to compare the level of said first level difference signal and that of said reference level signal and to generate a first switch-over control signal at a high level when the level of said first level difference signal is higher than that of said reference level signal and at a low level when said first level difference signal is lower than that of said reference level signal.

22. A device according to claim 21, wherein said second correlativity detecting means includes a reference level signal generating circuit which generates a reference level signal; and a second switch-over control signal generating circuit which is arranged to compare the level of said second level difference signal and that of said reference level signal and to generate a second switch-over control signal at a high level when the level of said second level difference signal is higher than that of said reference level signal and at a low level when said second level difference signal is lower than that of said reference level signal.

23. A device according to claim 22, wherein said output means is arranged to selectively produce one of a plurality of third interpolation signals generated by said third interpolation signal generating means according to a combination of the levels of said first and second switch-over control signals.

24. A device according to claim 20, wherein said output means includes a level comparison circuit which detects the relation of the magnitude of said first level difference signal to that of said second level difference signal; and said output means is arranged to perform selective control according to said relation.

25. A device according to claim 24, wherein said second interpolation signal generating means is arranged to generate a plurality of different second interpolation signals.

26. A device according to claim 25, wherein said third interpolation signal generating means includes a plurality of mixing circuits which are respectively arranged to mix said first interpolation signal with said second interpolation signals.

27. A device according to claim 26, further comprising mixing ratio control means which is arranged to detect correlativity between scanning signals of different fields and to control, according to the correlativity detected, a ratio in which said first interpolation signal is mixed with said second interpolation signal by each of said plurality of mixing circuits.

28. A device according to claim 27, wherein each of said plurality of mixing circuits includes a level varying circuit which is arranged to vary the level of applicable one of said second interpolation signals.

29. A device according to claim 28, wherein said mixing ratio control means is arranged to control said level varying circuit according to the correlativity between scanning signals of different fields.

30. A device according to claim 29, wherein said level varying circuit further includes a coefficient integration circuit which is arranged to multiply the level of said second interpolation signal by k times.

31. A device according to claim 30, wherein said mixing ratio control means is arranged to vary between 0 and 1 a coefficient k to be used in integrating said second interpolation signal at said coefficient integration circuit according to the correlativity between said scanning line signals of different fields.

* * * * *